United States Patent
Burt et al.

(10) Patent No.: US 7,083,158 B1
(45) Date of Patent: Aug. 1, 2006

(54) REMOTE OPERABLE CORPORATION STOP FOR WATER SUPPLY SOURCES

(76) Inventors: James E. Burt, 4046 Suburban Pines Dr., Lake Worth, FL (US) 33463; Frederick D. Ireland, 1551 NW. 3rd St., Boynton Beach, FL (US) 33435

( * ) Notice: Subject to any disclaimer, the term of this patent is extended or adjusted under 35 U.S.C. 154(b) by 0 days.

(21) Appl. No.: 10/846,856

(22) Filed: May 17, 2004

(51) Int. Cl.
*F16K 31/02* (2006.01)

(52) U.S. Cl. .......................... 251/129.03; 251/129.04; 251/129.11; 251/304

(58) Field of Classification Search ........... 251/129.03, 251/129.04, 129.11, 304
See application file for complete search history.

(56) References Cited

U.S. PATENT DOCUMENTS

| | | | |
|---|---|---|---|
| 5,813,655 A | 9/1998 | Pinchott et al. | |
| D412,561 S | 8/1999 | Voo | |
| 5,992,823 A | 11/1999 | Hung-Lin | |
| 6,216,727 B1 | 4/2001 | Genova et al. | |
| 6,253,791 B1 | 7/2001 | Miklo | |
| 6,337,635 B1 | 1/2002 | Erickson et al. | |
| 6,374,846 B1 | 4/2002 | DeSmet | |
| 2002/0145126 A1 | 10/2002 | Lian | |

*Primary Examiner*—David J. Walczak
*Assistant Examiner*—Peter deVore

(57) ABSTRACT

A system connectable to a water line for controlling the flow of water includes an underground housing, a shut-off mechanism disposed within the housing and connected to the water lines, and a controlling mechanism including a wand for sending a signal to the shut-off mechanism and thereby open and close the system. The shut-off mechanism includes a motor, an actuator interface, and a drive shaft operably connected to each other wherein the drive shaft rotates based upon the signal from the wand so that water flow can be adjusted as desired by an operator. The controlling mechanism includes an antenna and transceiver for communicating with the wand. The actuator interface is coupled to the antenna for processing and communicating a signal received from the wand and transmitting same to the motor and drive shaft.

6 Claims, 5 Drawing Sheets

REMOTE OPERABLE CORPORATION STOP FOR WATER SUPPLY SOURCES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a corporation stop for water supply sources and, more particularly, to a corporation stop that may be remotely operated by a user.

2. Prior Art

A shutoff valve is adapted to control the water flow between a water source and a supply pipe which sequentially connects to a tap for supplying water to a sink, a basin or a bath. The shutoff valve can control the water flow and shut off the water flow to facilitate the replacement of a tap from a pipe. A conventional valve commonly employed in the industry is known as a corporation stop. The use of a corporation stop is required when the process water pipe cannot be drained to allow for maintenance. A corporation stop allows for repairs to be made while the water pipe remains full and pressurized.

In large agricultural irrigation systems, it is known to use remote-control valves to control water flow in different branches of a water distribution network. A remote-control valve in such an application typically employs a radio receiver for receiving control signals transmitted from a user-operated transmitter. The use of remote-control valves allows the operator of an irrigation system to control water distribution by opening and closing the valves from a distance without having to travel to the physical locations of the valves.

Nevertheless, remote-control valves used in irrigation networks buried underground tend to be fairly complex, large, and expensive and are therefore not suitable for typical yard and garden applications. So far, remote-control valves that are portable and sufficiently compact and easy to use so as to be suitable for yard and garden applications have not been available.

While prior art products exist in the filed of water shut-off valves, there remains a problem in that the valves may fail when called upon to close. Many rural and municipal water systems are located in remote areas and therefore may not be receptive to multiple RF signals transmitted thereto over a long distances. As a result, the valves may not be effectively opened and closed when desired.

Accordingly, a need remains for a corporation stop and shut-off mechanism for a water supply source that may be effectively operated by a user for overcoming the above-noted shortcomings.

BRIEF SUMMARY OF THE INVENTION

In view of the foregoing background, it is therefore an object of the present invention to provide a remote operable corporation stop for enabling water to be more easily cutoff for various reasons including nonpayment and repairs. These and other objects, features, and advantages of the invention are provided by a system connectable to an existing water line for selectively controlling the flow of water therethrough. Such a system includes a housing positionable into a ground surface and spaced upstream a select distance from an existing water meter.

The housing has a plurality of openings for receiving a first water supply line with a first flow rate and directing a second water supply line with a second flow rate towards the existing water line wherein the second supply line is in fluid communication with the existing water meter. The housing may further include a lid removably connected thereto for allowing an operator to readily access the controlling and shut-off mechanisms (described hereinbelow) disposed within the housing.

Such a mechanism for shutting off water flow through the housing is disposed within the housing and contiguously connected to the first and second water supply lines. The shut-off mechanism further includes a motor operably connected to an actuator interface and includes a drive shaft extending outwardly therefrom. Such a drive shaft is rotatable in a select direction based upon the signal transmitted by the wand. The shut-off mechanism further includes an arm pivotally connected to the drive shaft that is movable along a select arcuate path.

Advantageously, the shut-off mechanism further includes a valve member secured to the arm that is caused to contemporaneously move with the arm during operating conditions so that the first and second water flow rates can be adjusted as desired by an operator. Such a valve member may be rotatable approximately one quadrant per 3 seconds to prevent a water hammer and air lock from occurring in the water main when the system is turned on and off, respectively.

Advantageously, the present invention further includes a mechanism for operably controlling the shut-off mechanism so that an operator can selectively control the first and second flow rates. The controlling mechanism is connected to the shut-off mechanism and is disposed within the housing, wherein the controlling mechanism includes a hand-operable wand for generating and sending a signal to the shut-off mechanism for toggling the system between open and closed modes.

The controlling mechanism further includes an antenna with a transceiver connecting thereto for transmitting and receiving a signal from the wand. The actuator interface electrically coupled to the antenna for processing the signal received from the wand and communicating such a signal with the shut-off mechanism during operating conditions.

The present invention further includes a power supply source passing through the housing that is connected to the controlling and shut-off mechanism respectively.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
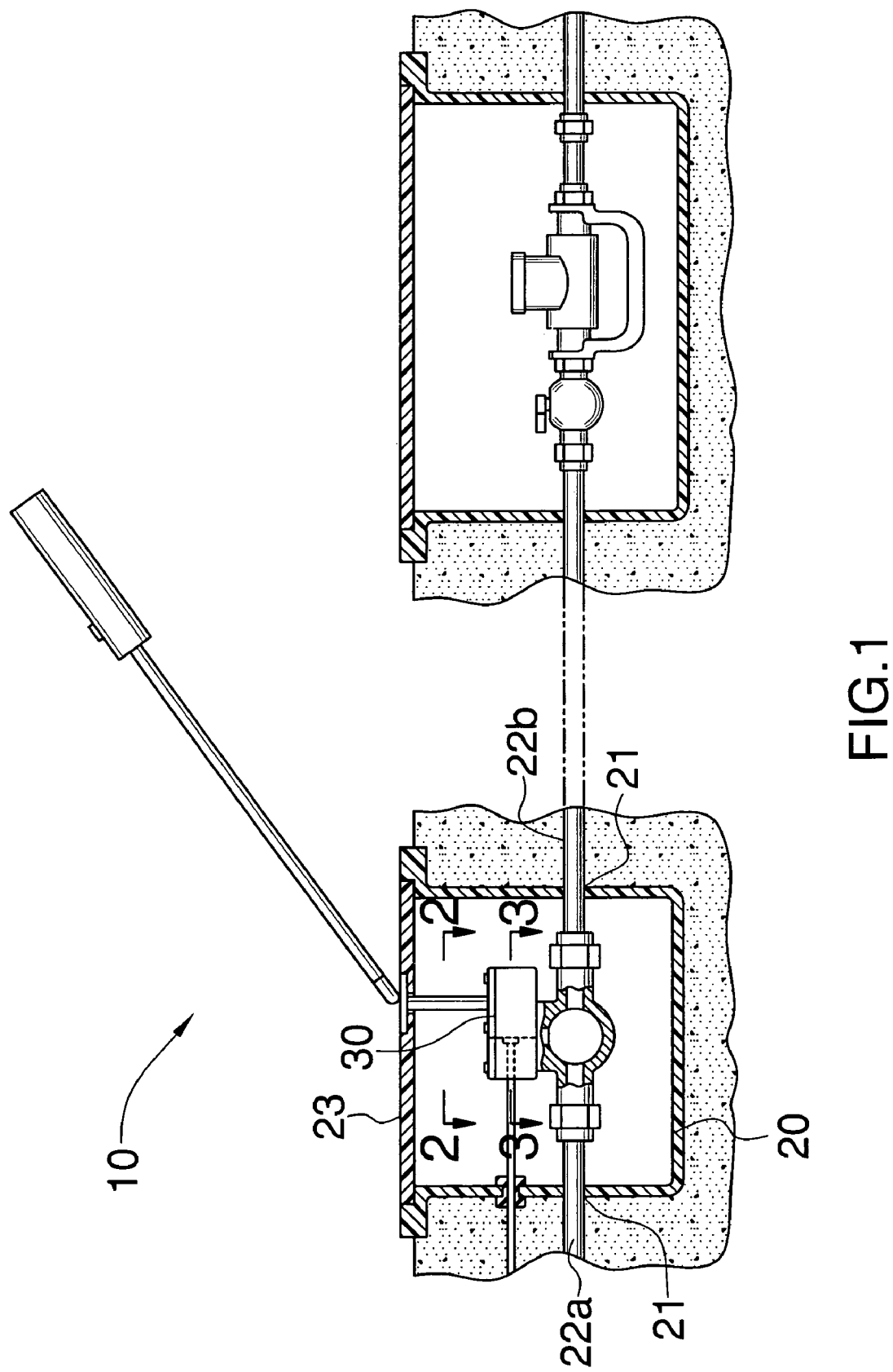
FIG. 1 is a partial cross-sectional view showing a remote operable corporation stop in fluid connection with an existing water supply source, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1–5 by the reference numeral 10 and is intended to provide a remotely operable system for shutting off the flow of water from a supply source. It should be understood that the system 10 may be used to cut off a supply of water from a variety of supply sources employing a different valve types.

Referring initially to FIG. 1, the system 10 includes a housing 20 positionable into a ground surface and spaced upstream a select distance from an existing water meter. The housing 20 has a plurality of openings 21 for receiving a first water supply line 22a with a first flow rate and directing a second water supply line 22b with a second flow rate towards the existing water line wherein the second supply line 22b is in fluid communication with the existing water meter. The housing 20 may further include a lid 23 removably connected thereto for allowing an operator to readily access the controlling and shut-off mechanisms (described hereinbelow) disposed within the housing 20.

Figure 2:
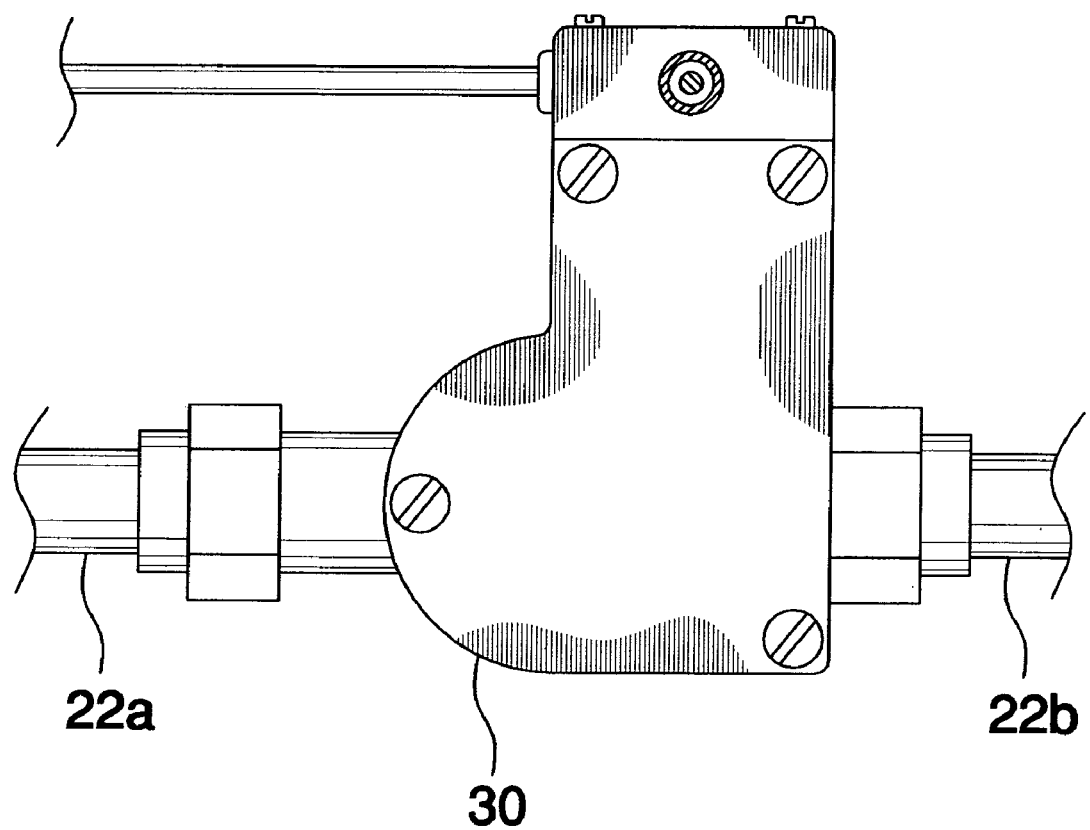
FIG. 2 is an enlarged top plan view of the shut-off mechanism, taken along line 2—2.
Figure 3:
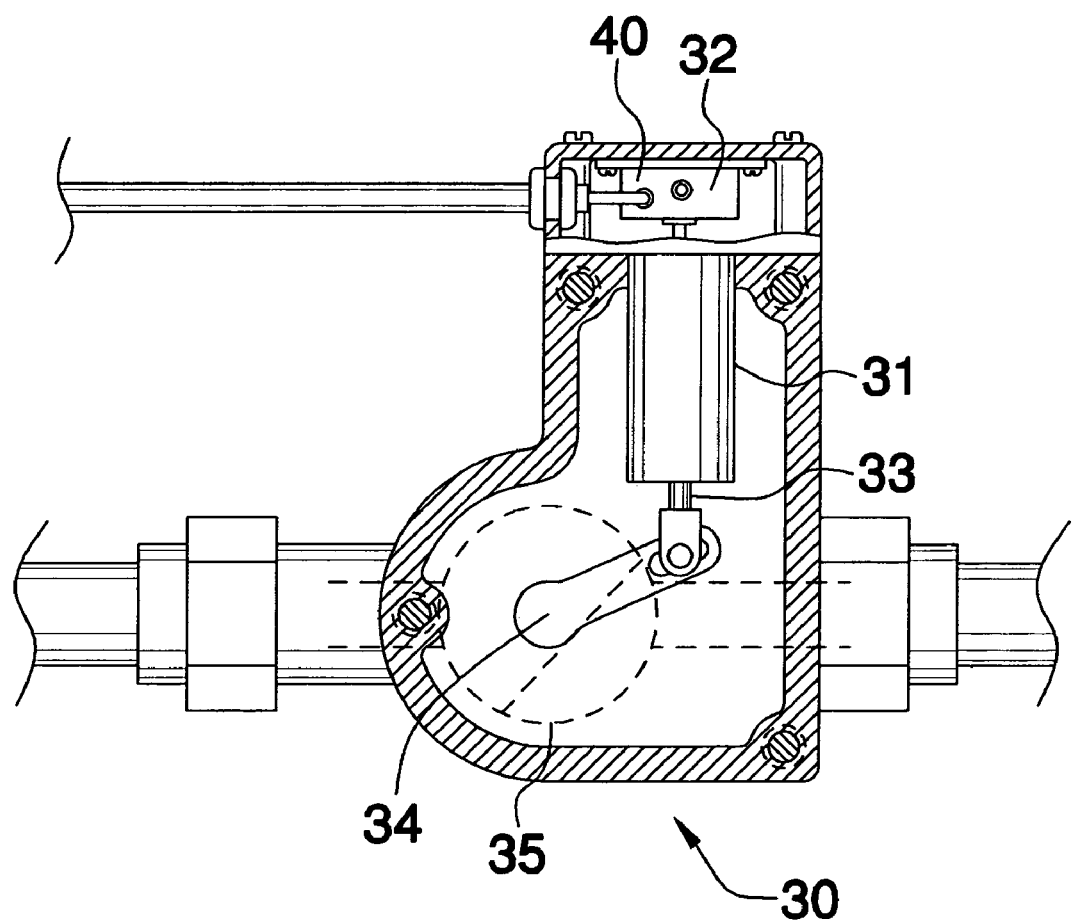
FIG. 3 is a cross-sectional view of FIG. 2 showing the shut-off mechanism at a closed position, taken along line 3—3.

Referring to FIGS. 2 and 3, such a mechanism 30 for shutting off water flow through the housing 20 is disposed within the housing 20 and contiguously connected to the first 22a and second 22b water supply lines. The shut-off mechanism 30 further includes a motor 31 operably connected to an actuator interface 32 and includes a drive shaft 33 extending outwardly therefrom. Such a drive shaft 33 is rotatable in a select direction based upon the signal transmitted by the wand. The shut-off mechanism 30 further includes an arm 34 pivotally connected to the drive shaft 33 that is movable along a select arcuate path.

Advantageously, the shut-off mechanism 30 further includes a valve member 35 secured to the arm 34 that is caused to contemporaneously move with the arm 34 during operating conditions so that the first and second water flow rates can be adjusted as desired by an operator. Such a valve member 35 may be rotatable approximately one quadrant per 3 seconds to prevent a water hammer and air lock from occurring in the water main when the system is turned on and off, respectively.

Figure 4:
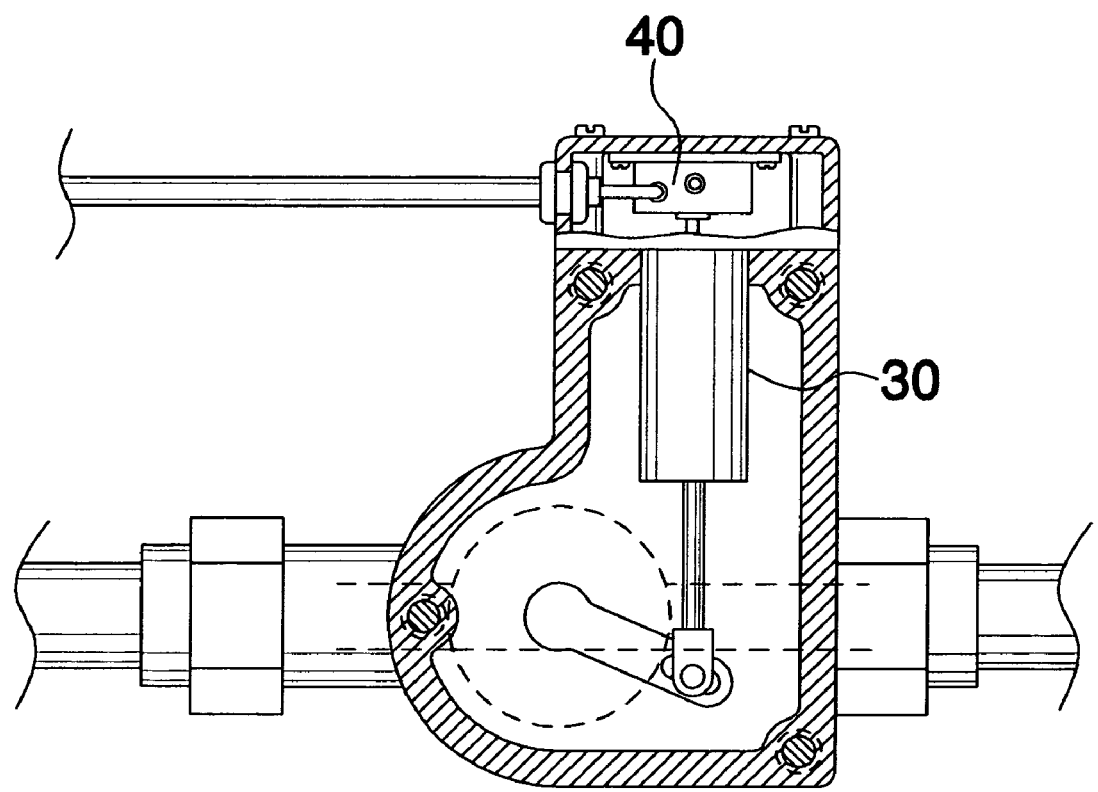
FIG. 4 is a cross-sectional view of FIG. 2 showing the shut-off mechanism at an open position.

Referring to FIGS. 3 and 4, the present invention advantageously includes a mechanism 40 for operably controlling the shut-off mechanism 30 so that an operator can selectively control the first and second flow rates. The controlling mechanism 40 is connected to the shut-off mechanism 30 and is disposed within the housing 20, wherein the controlling mechanism 40 includes a hand-operable wand for generating and sending a signal to the shut-off mechanism 30 for toggling the system 10 between open and closed modes.

Figure 5:
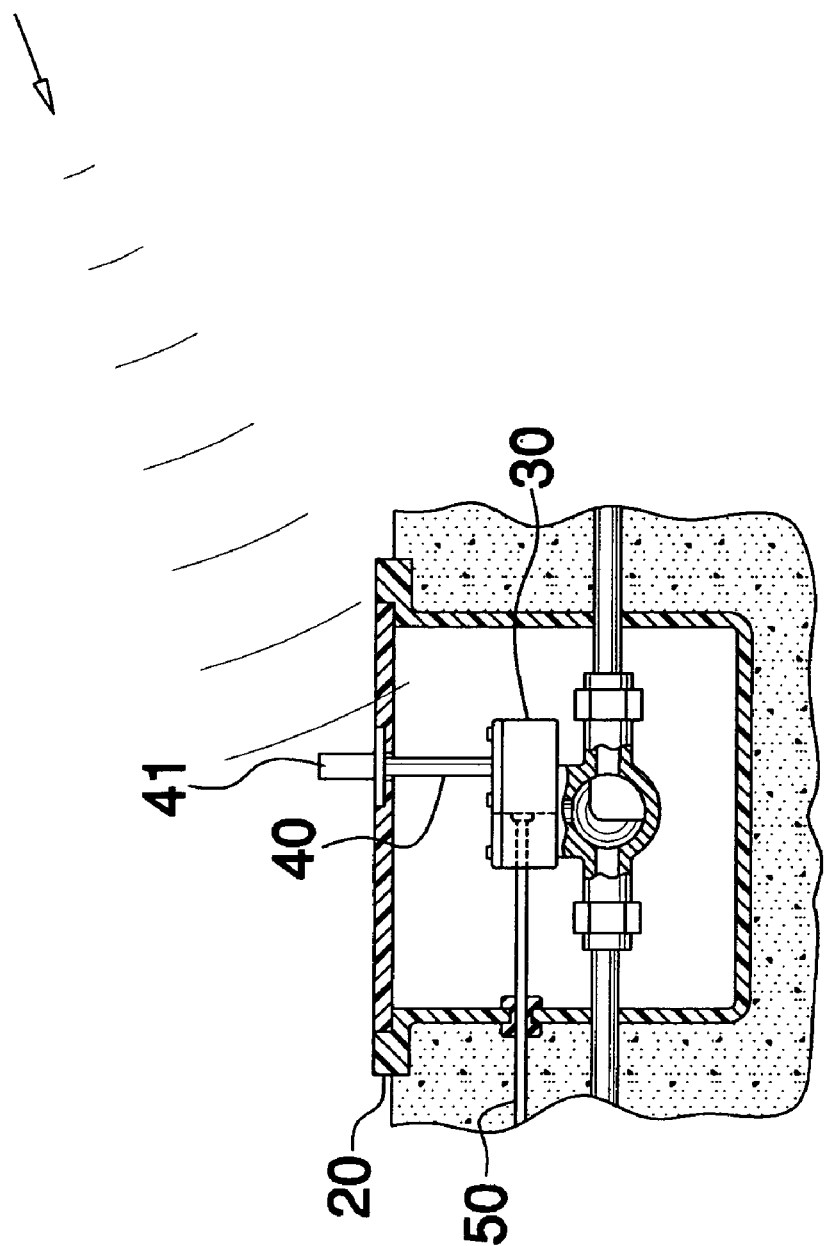
FIG. 5 is a partial cross-sectional view showing the antenna of the controlling mechanism at a raised position.

Referring to FIG. 5, the controlling mechanism 40 further includes an antenna with a transceiver 41 connecting thereto for transmitting and receiving a signal from the wand. The actuator interface 32 is electrically coupled to the antenna for processing the signal received from the wand and communicating such a signal with the shut-off mechanism 30 during operating conditions.

The present invention further includes a power supply source 50 passing through the housing 20 that is connected to the controlling 40 and shut-off 30 mechanism respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A system connectable to an existing water line and for selectively controlling the flow of water therethrough, said system comprising:

a housing positionable into a ground surface and spaced upstream a select distance from an existing water meter, said housing having a plurality of openings for receiving a first water supply line having a first flow rate and directing a second water supply line having a second flow rate towards the existing water line, said second supply line being in fluid communication with the existing water meter;

means for shutting off water flow through said housing, said shutoff means being disposed within said housing and contiguously connected to the first and second water supply lines;

means for operably controlling said shut-off means so that an operator can selectively control the first and second flow rates, said controlling means being connected to said shut-off means and being disposed within said housing, wherein said controlling means comprises a hand-operable wand for generating and sending a signal to said shut-off means for toggling said system being open and closed modes; and a power supply source passing through said housing and being connected to said controlling and shut-off means respectively;

wherein said controlling means further comprises: an antenna including a transceiver connecting thereto for transmitting and receiving a signal from said wand;

wherein said controlling means further comprises: an actuator interface electrically coupled to said antenna for processing the signal from said wand and communicating with said shut-off means during operating conditions;

wherein said shut-off means comprises
  a motor operably connected to said actuator interface and including a drive shaft extending outwardly therefrom, said drive shaft being rotatable in a select direction based upon the signal transmitted by said wand,
  an arm pivotally connected to said drive shaft and being movable along a select arcuate path, and
  a valve member secured to said arm and being caused to contemporaneously move with said arm during operating conditions so that the first and second water flow rates can be adjusted as desired by an operator, said valve member being rotatable approximately one quadrant per 3 seconds to prevent a water hammer and air lock from occurring in the water main when said system is turned on and off respectively.

2. The system of claim 1, wherein said housing comprises: a lid removably connected thereto and for allowing an operator to readily access said controlling and shut-off means disposed within said housing.

3. A system connectable to an existing water line and for selectively controlling the flow of water therethrough, said system comprising:
  a housing positionable into a ground surface and spaced upstream a select distance from an existing water meter, said housing having a plurality of openings for receiving a first water supply line having a first flow rate and directing a second water supply line having a second flow rate towards the existing water line, said second supply line being in fluid communication with the existing water meter;
  means for shutting off water flow through said housing, said shut-off means being disposed within said housing and contiguously connected to the first and second water supply lines;
  means for operably controlling said shut-off means so that an operator can selectively control the first and second flow rates, said controlling means being connected to said shut-off means and being disposed within said housing, wherein said controlling means comprises
    a hand-operable wand for generating and sending a signal to said shut-off means for toggling said system being open and closed modes, and
    an antenna including a transceiver connecting thereto for transmitting and receiving a signal from said wand; and
  a power supply source passing through said housing and being connected to said controlling and shut-off means respectively;
  wherein said controlling means further comprises: an actuator interface electrically coupled to said antenna for processing the signal from said wand and communicating with said shut-off means during operating conditions;
  wherein said shut-off means comprises
    a motor operably connected to said actuator interface and including a drive shaft extending outwardly therefrom, said drive shaft being rotatable in a select direction based upon the signal transmitted by said wand,
    an arm pivotally connected to said drive shaft and being movable along a select arcuate path, and
    a valve member secured to said arm and being caused to contemporaneously move with said arm during operating conditions so that the first and second water flow rates can be adjusted as desired by an operator, said valve member being rotatable approximately one quadrant per 3 seconds to prevent a water hammer and air lock from occurring in the water main when said system is turned on and off respectively.

4. The system of claim 3, wherein said housing comprises: a lid removably connected thereto and for allowing an operator to readily access said controlling and shut-off means disposed within said housing.

5. A system connectable to an existing water line and for selectively controlling the flow of water therethrough, said system comprising:
  a housing positionable into a ground surface and spaced upstream a select distance from an existing water meter, said housing having a plurality of openings for receiving a first water supply line having a first flow rate and directing a second water supply line having a second flow rate towards the existing water line, said second supply line being in fluid communication with the existing water meter;
  means for shutting off water flow through said housing, said shut-off means being disposed within said housing and contiguously connected to the first and second water supply lines;
  means for operably controlling said shut-off means so that an operator can selectively control the first and second flow rates, said controlling means being connected to said shut-off means and being disposed within said housing, wherein said controlling means comprises
    a hand-operable wand for generating and sending a signal to said shut-off means for toggling said system being open and closed modes,
    an antenna including a transceiver connecting thereto for transmitting and receiving a signal from said wand, and
    an actuator interface electrically coupled to said antenna for processing the signal from said wand and communicating with said shut-off means during operating conditions; and
  a power supply source passing through said housing and being connected to said controlling and shut-off means respectively;
  wherein said shut-off means comprises
    a motor operably connected to said actuator interface and including a drive shaft extending outwardly therefrom, said drive shaft being rotatable in a select direction based upon the signal transmitted by said wand,
    an arm pivotally connected to said drive shaft and being movable along a select arcuate path, and
    a valve member secured to said arm and being caused to contemporaneously move with said arm during operating conditions so that the first and second water flow rates can be adjusted as desired by an operator, said valve member being rotatable approximately one quadrant per 3 seconds to prevent a water hammer and air lock from occurring in the water main when said system is turned on and off respectively.

6. The system of claim 5, wherein said housing comprises: a lid removably connected thereto and for allowing an operator to readily access said controlling and shut-off means disposed within said housing.

* * * * *